United States Patent
Hong et al.

(10) Patent No.: US 8,491,172 B2
(45) Date of Patent: Jul. 23, 2013

(54) SYMMETRIC SERRATED EDGE LIGHT GUIDE FILM HAVING ELLIPTICAL BASE SEGMENTS

(75) Inventors: Qi Hong, Hudson, MA (US); Karen A. Malburne, Hudson, MA (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 239 days.

(21) Appl. No.: 13/174,332

(22) Filed: Jun. 30, 2011

(65) Prior Publication Data

US 2013/0003413 A1 Jan. 3, 2013

(51) Int. Cl.
*F21V 7/04* (2006.01)
*F21V 7/05* (2006.01)

(52) U.S. Cl.
USPC ............................................ 362/608; 362/621

(58) Field of Classification Search
USPC ...................... 362/600–634; 349/65
See application file for complete search history.

(56) References Cited

U.S. PATENT DOCUMENTS

| | | | |
|---|---|---|---|
| 6,065,845 A | 5/2000 | Miyazaki | |
| 7,001,035 B2 | 2/2006 | Kawakami | |
| 7,110,642 B2 | 9/2006 | Maeda et al. | |
| 7,347,610 B2 | 3/2008 | Chang et al. | |
| 7,350,957 B2 | 4/2008 | Liao | |
| 7,350,958 B2 | 4/2008 | Yang | |
| 7,649,590 B2 | 1/2010 | Park et al. | |
| 7,808,578 B2 | 10/2010 | Ye | |
| 2004/0145914 A1* | 7/2004 | Yu et al. | 362/558 |
| 2012/0140516 A1* | 6/2012 | Lin et al. | 362/607 |

FOREIGN PATENT DOCUMENTS

JP 11-203923 7/1999
WO WO 2010/119590 10/2010

* cited by examiner

*Primary Examiner* — Karabi Guharay
*Assistant Examiner* — Nathaniel Lee
(74) *Attorney, Agent, or Firm* — Edwin Oh (57) ABSTRACT

The present invention provides a planar light guide film for a backlight unit having at least one point light source, the light guide film comprising a light input surface for receiving light from the point light source, a light redirecting surface for redirecting light received from the light input surface and a light output surface for outputting at least the light redirected from the light redirecting surface. The light input surface further comprises a composite lens structure having a circular tip segment with a first contact angle, and a first and second elliptical base segments with a second contact angle, the second contact angle being less than the first contact angle and the second contact angle being equal to each other and wherein the circular tip segment satisfies the following equation:

$$y_1 = a_1 + \sqrt{(r_1^2 - x^2)}$$

and the elliptical base segments satisfies the following equations:

$$y_4 = d_4 + b_4 \times \sqrt{1 - ((x+c_4)/a_4)^2}$$

$$y_5 = d_5 + b_5 \times \sqrt{1 - ((x-c_5)/a_5)^2}.$$

10 Claims, 13 Drawing Sheets

SYMMETRIC SERRATED EDGE LIGHT GUIDE FILM HAVING ELLIPTICAL BASE SEGMENTS

FIELD OF THE INVENTION

The present invention relates to a light guide film of a light emitting diode (LED) backlight unit, and, more particularly, to a light guide film of an LED backlight unit, which has a plurality of grooves carved into an incident plane of the light guide film to increase an incidence angle of which light can be transmitted through the light guide film.

BACKGROUND OF THE INVENTION

Figure 1:
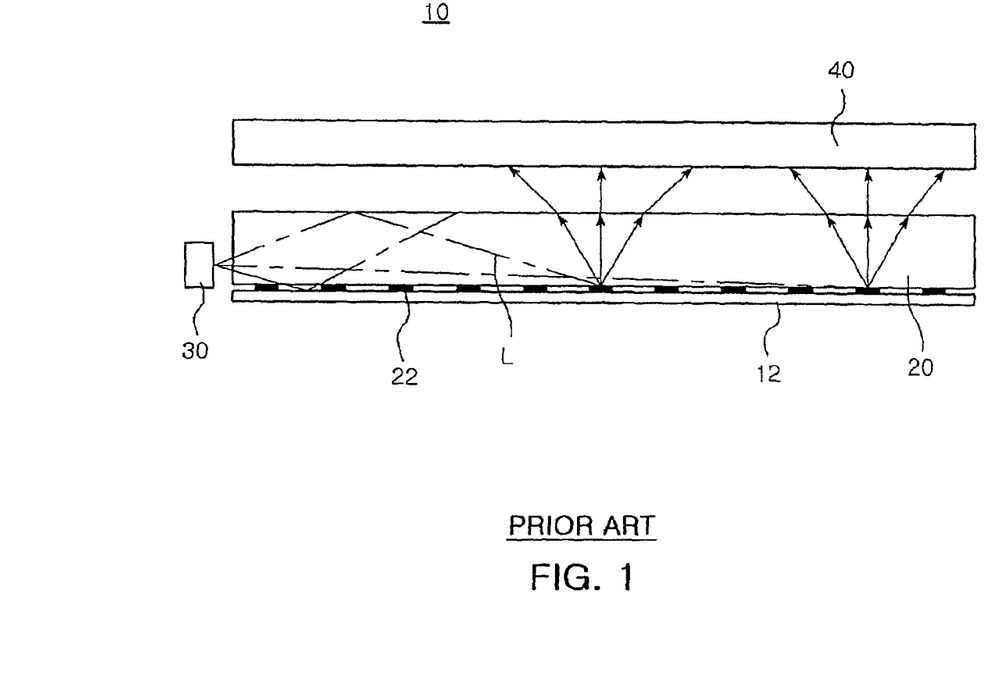
FIG. 1 shows a schematic diagram illustrating a conventional backlight module.

Typically, a liquid crystal display (LCD) for handheld and notebook devices generally employs at least one lateral light emitting diode (LED) as a light source of a backlight unit. Such a lateral LED is generally provided to the backlight unit as shown in FIG. 1 of Yang U.S. Pat. No. 7,350,958.

Referring to FIG. 1, the backlight unit 10 comprises a planar light guide film 20 disposed on a substrate 12, and a plurality of lateral LEDs 30 (only one lateral LED is shown in FIG. 1) disposed in an array on a lateral side of the light guide film 20. Light L entering the light guide film 20 from the LED 30 is reflected upwardly by a minute reflection pattern 22 and a reflection sheet (not shown) positioned on the bottom of the light guide film 20, and exits from the light guide film 20, providing back light to an LCD panel 40 above the light guide film 20. Such a backlight unit 20 suffers from a problem as shown in FIG. 2 when light is incident on the light guide film 20 from the LED 30.

Figure 2:
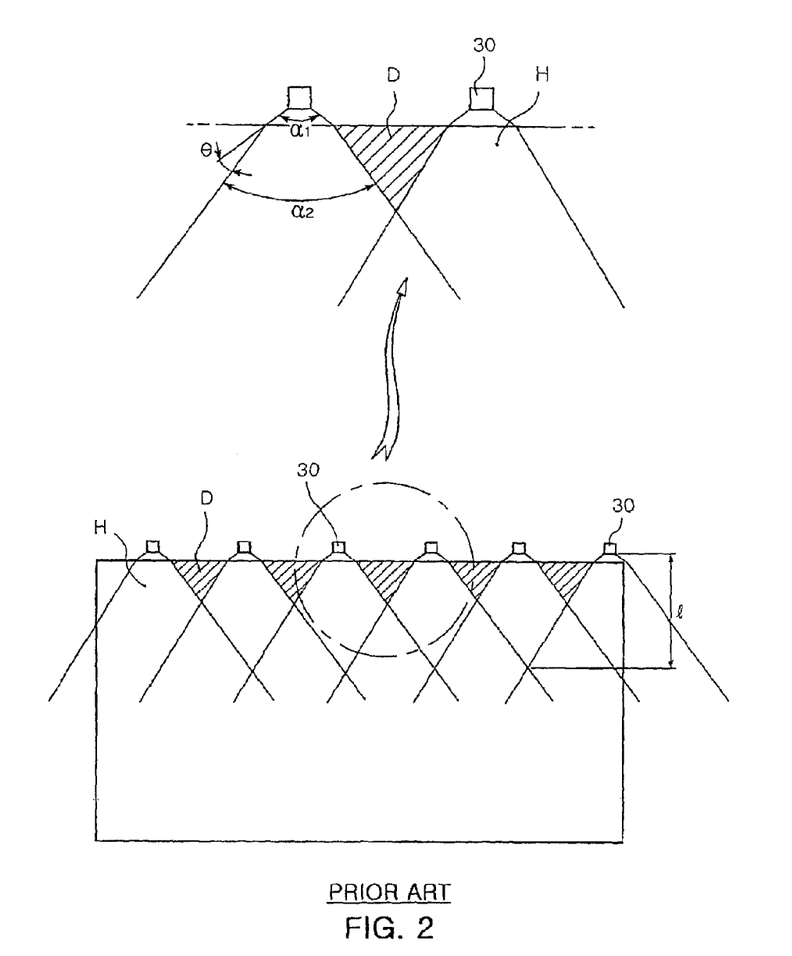
FIG. 2 shows a schematic diagram illustrating the distribution of bright/dark bands of a conventional light guide plate.
Figure 3:
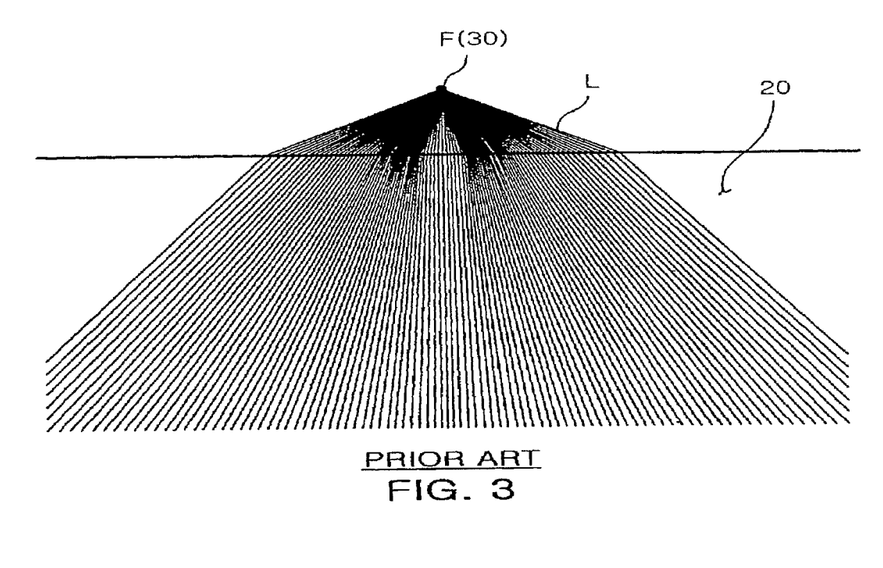
FIG. 3 shows a schematic diagram illustrating an embodiment of conventional light-diffusing structures.

As shown in FIG. 2, light L emitted from each LED 30 is refracted toward the light guide film 20 by a predetermined angle θ due to difference in refractive index between media according to Snell's Law when the light L enters the light guide film 20. In other words, even though the light L is emitted at a beam angle of α1 from the LED 30, it is incident on the light guide film 20 at an incidence angle of α2 less than α1. In FIG. 3, such an incidence profile of light L is shown. Therefore, there is a problem of increasing the length (l) of a combined region where beams of light L entered the light guide film 20 from the respective LEDs 30 are combined. In addition, light spots H also called "hot spots" and dark spots D are alternately formed in the region corresponding to the length (l) on the incident plane of the light guide film 20. Each of the light spots H is formed at a location facing the LED 30, and each of the dark spots D is formed between the light spots H.

Since the alternately formed light and dark spots are not desirable for the light guide film, they should be minimized and the length (l) should be shortened as much as possible. For this purpose, it is necessary to increase an angle of light entering the light guide film, that is, an incidence angle of light.

Figure 4:
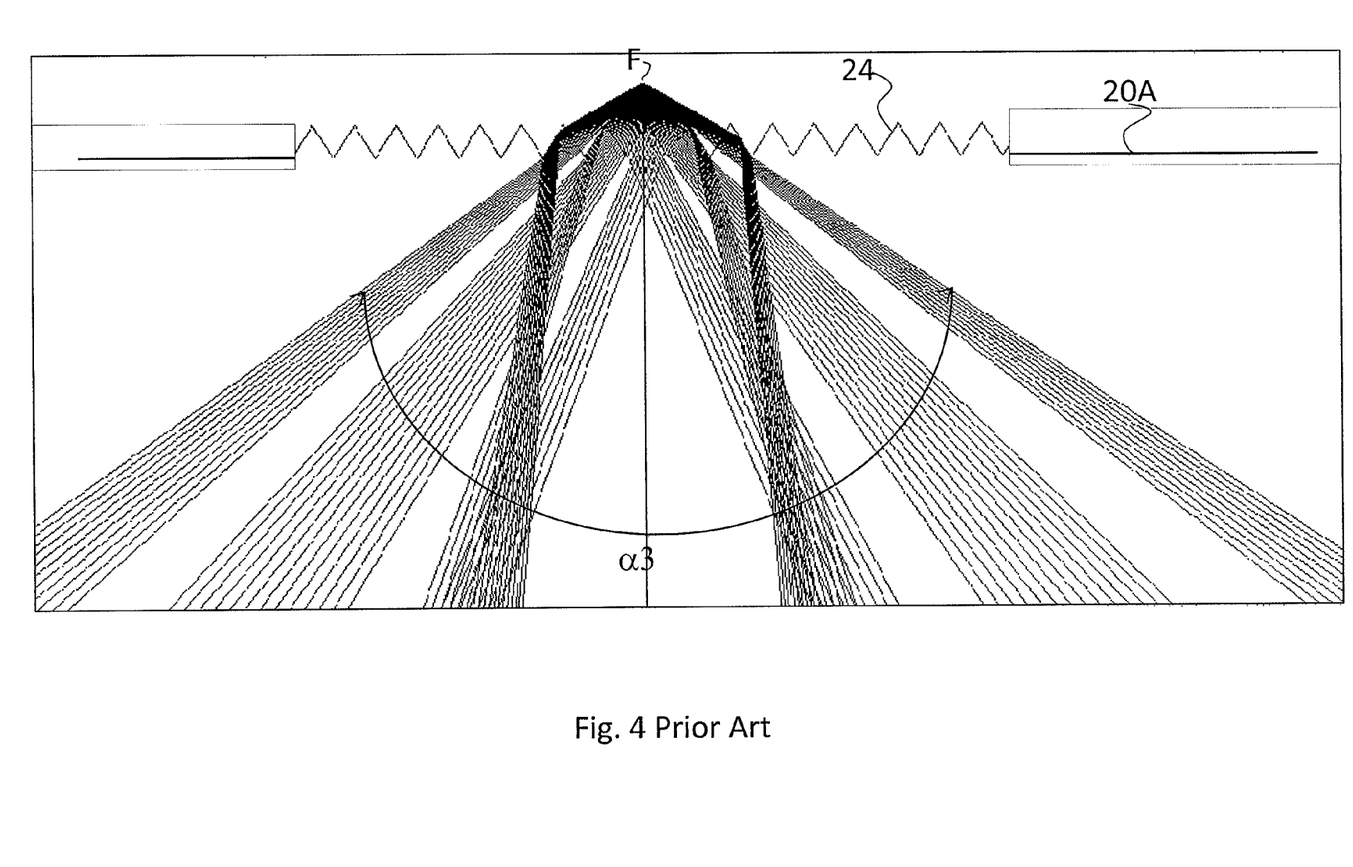
FIG. 4 shows a schematic diagram illustrating another embodiment of conventional light-diffusing structures.

For this purpose, it is suggested to form protrusions on the input surface of the light guide film as shown in FIG. 4. Specifically, a plurality of fine prism-shaped structures 24 or arc-shaped structures (not shown) are formed on a light input surface of a light guide film 20A and light L enters the light guide film at an incidence angle α3 substantially equal to an orientation angle α1 of light emitted from a focal point F of a light source. Thus, if orientation angles al of light beams emitted from the focal point F of the light source are identical, the light L enters the light guide film at an incidence angle α3 wider than the case of FIGS. 2 and 3. However, with this solution, there is some secondary light collimation where the light rays are refracted by the wall of the adjacent prism or arc-shaped structure as shown in FIG. 4. Secondary light collimation from the walls of the adjacent prism structure turns the light ray back on-axis providing less diffusion of the light from the light source as shown in FIG. 4. Thus the continuous prism- or arc-shaped structures on the input surface have limited light diffusing capability.

Therefore an improved input edge design is needed to provide a more uniform surface illumination of the light guide film without sacrficing the efficiency of the backlight system.

SUMMARY OF THE INVENTION

The present invention provides a planar light guide film for a backlight unit having at least one point light source, the light guide film comprising: a light input surface for receiving light from the point light source; a light redirecting surface for redirecting light received from the light input surface; a light output surface for outputting at least the light redirected from the light redirecting surface; wherein the light input surface further comprises a composite lens structure having a circular tip segment with a first contact angle, and a first and second elliptical base segments with a second contact angle, the second contact angle being less than the first contact angle and the second contact angle being equal to each other; and wherein the circular tip segment satisfies the following equation:

$$y_1 = a_1 + \sqrt{(r_1^2 - x^2)}$$

and the elliptical base segments satisfies the following equations:

$$y_4 = d_4 + b_4 \times \sqrt{(1-((x+c_4)/a_4)^2)}$$

$$y_5 = d_5 + b_5 \times \sqrt{(1-((x-c_5)/a_5)^2)}$$

In addition, the invention further provides a planar light guide film for a backlight unit having at least one point light source, the light guide film comprising: a light input surface for receiving light from the point light source; a light redirecting surface for redirecting light received from the light input surface; a light output surface for outputting at least the light redirected from the light redirecting surface; wherein the light input surface further comprises a composite lens structure having gaps there between, the lens structure having a circular tip segment with a first contact angle, and a first and second elliptical base segments with a second contact angle, the second contact angle being less than the first contact angle and the second contact angle being equal to each other; and wherein the circular tip segment satisfies the following equation:

$$y_1 = a_1 + \sqrt{(r_1^2 - x^2)}$$

and the elliptical base segments satisfies the following equations:

$$y_4 = d_4 + b_4 \times \sqrt{(1-((x+c_4)/a_4)^2)}$$

$$y_5 = d_5 + b_5 \times \sqrt{(1-((x-c_5)/a_5)^2)}$$

Further, the invention provides a planar light guide film for a backlight unit having at least one point light source, the light guide film comprising: a light input surface for receiving light from the point light source; a light redirecting surface for redirecting light received from the light input surface; a light output surface for outputting at least the light redirected from the light redirecting surface; wherein the light input surface further comprises a serrated lens structure that is provided only where the point light source is incident on the light input surface, the lens structure having a circular tip segment with a first contact angle, and a first and second elliptical base segments with a second contact angle, the second contact angle being less than the first contact angle and the second contact angle being equal to each other; and
wherein the circular tip segment satisfies the following equation:

$$y_1 = a_1 + \sqrt{(r_1^2 - x^2)}$$

and the elliptical base segments satisfies the following equations:

$$y_4 = d_4 + b_4 \times \sqrt{(1 - ((x + c_4)/a_4)^2}$$

$$y_5 = d_5 + b_5 \times \sqrt{(1 - ((x - c_5)/a_5)^2}$$

DETAILED DESCRIPTION OF THE INVENTION

A light guide film in accordance with the present invention comprises a light output surface, a light redirecting surface and at least one light input surface that joins the light output surface and the light redirecting surface. The light input surface comprises a plurality of concave features consisting of a composite lens array. Each of the composite lenses is separated by a gap that is a flat surface perpendicular to the light output surface. The composite lenses and gaps are disposed along the light input surface, and extend from the output surface to the light redirecting surface. Each of the composite lenses has a symmetric cross-section consisting of a tip portion comprising a circular tip segment of a first contact angle and a base portion comprising two tilted elliptical base segments with a second contact angle, the second contact angle being less than the first contact angle and where the contact angle for each of the two tilted elliptical base segments are equal.

According to the above embodiment, the geometrical profile of the composite lens allows for comparatively large light deflecting distances; that is, the composite lens structure has better light-diffusing capability. Thus, the distance between the point light source and the active area of the display can be shortened, and the dark spots between the point light sources can be minimized, with the brightness uniformity still being acceptable. The circular tip segment uniformly distributes the light in front of the discrete light source, typically a light emitting diode (LED). The two tilted elliptical base segments uniformly distribute the light between the LEDs. A smooth curvature of the circular tip segment and tilted elliptical base segments maximizes the uniformity of the light spatial distribution so that the light output is uniform. Further, it is also necessary that each two adjacent composite lens structures have a gap or flat therebetween so a greater degree of deflection on the propagation path of the incident light can be achieved to thereby increase the light-diffusing effect.

Figures 5A, 5B:
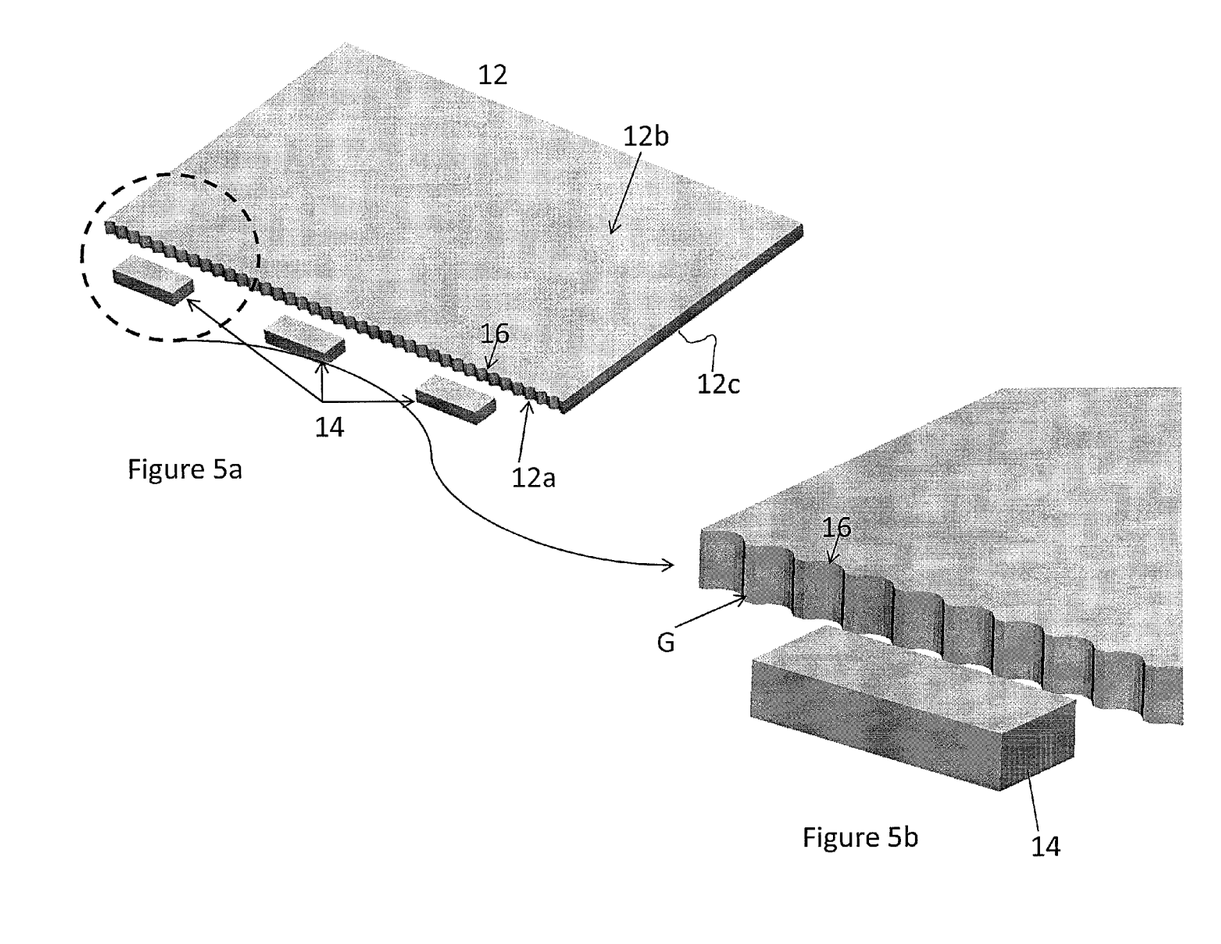
FIGS. 5a and 5b shows a schematic diagram illustrating a light guide film according to an embodiment of the invention.

Referring to FIGS. 5a and 5b, a light guide film according to an embodiment of the invention is shown, wherein a planar light guide film 12 is used to receive and guide the light from at least one point light source (such as LEDs 14 shown in FIG. 5a). The side surface of the light guide film 12 next to the LED 14 forms a light input surface 12a. The top surface of the light guide film 12 that makes an angle with the light input surface 12a forms a light-emitting surface 12b, and the bottom surface opposite the light-emitting surface 12b forms a light-reflecting surface 12c. The light-reflecting surface 12c is comprised of a plurality of light reflecting structures. The light emitted from the LED 14 enters the light guide film 12 via the light input surface 12a and propagates inside the light guide film 12. Then, it is guided toward the light-emitting surface 12b by the light-reflecting surface 12c and finally exits the light guide film 12 through the light-emitting surface 12b.

Figure 6A:
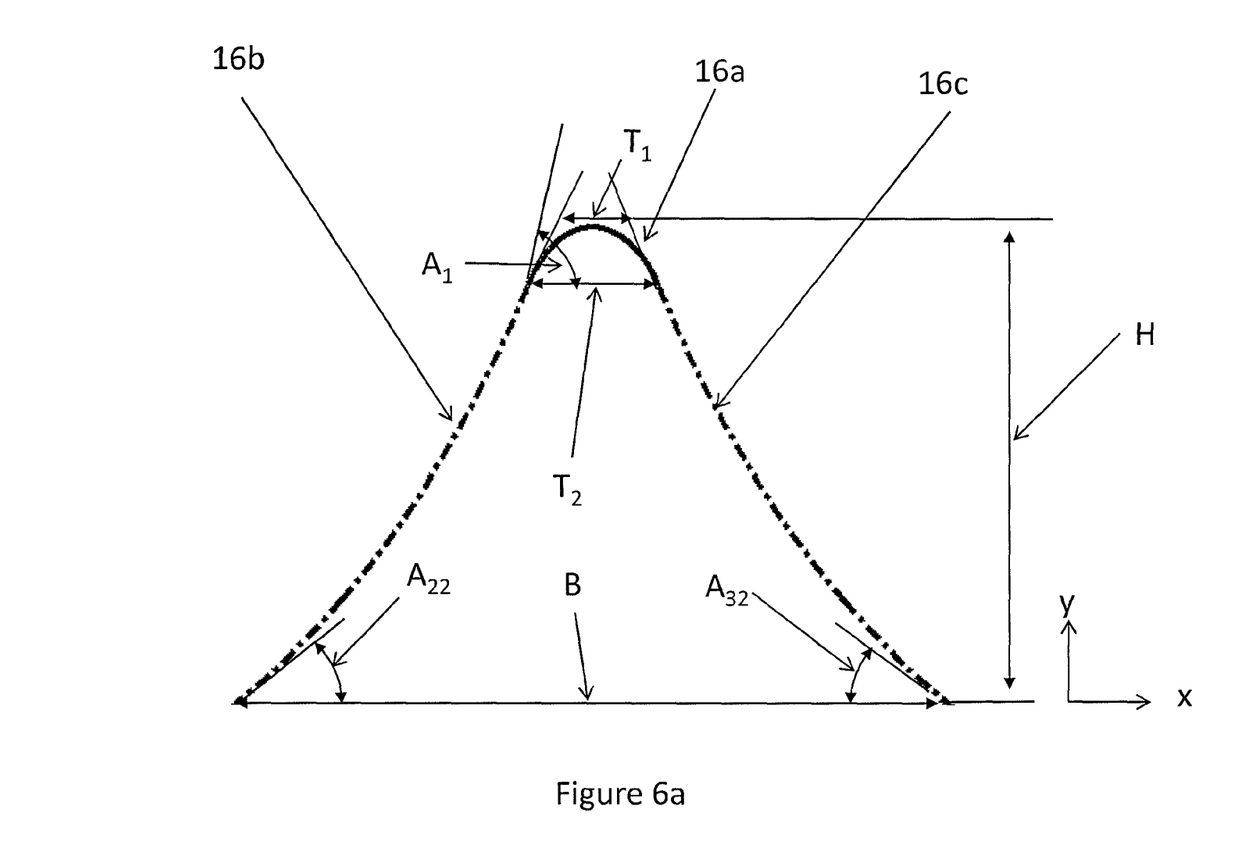
FIG. 6a-6c show schematic diagrams illustrating the various segments of the composite lens feature according to an embodiment of the invention.
Figure 6B:
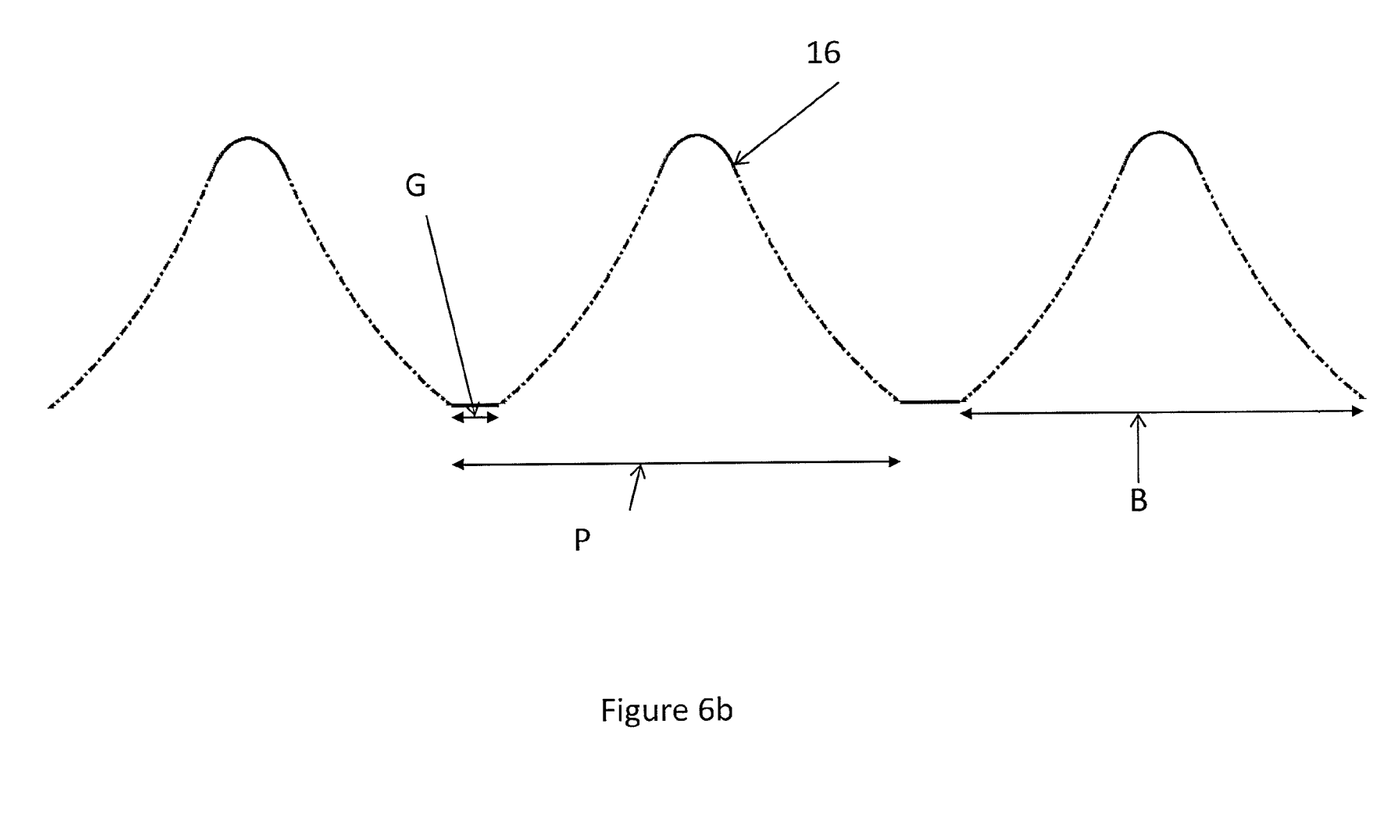
Figure 6C:
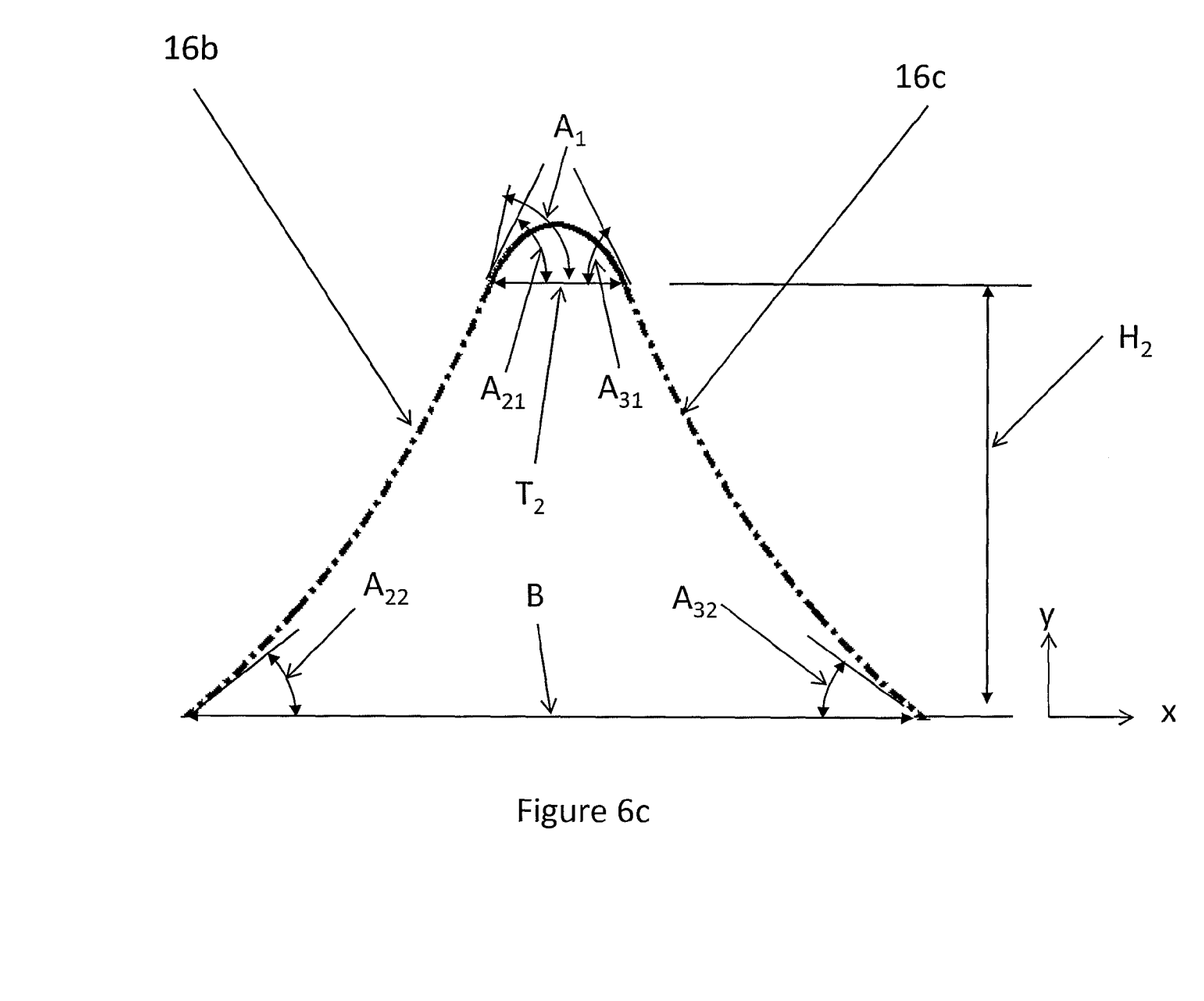

Further, a plurality of concave composite lens structures 16 are serrated on the edge of the light input surface 12a, with their longitudinal directions being parallel to each other and having a gap (G) between each adjacent composite lens structure 16. Referring now to FIGS. 6a, 6b and 6c, the light input surface 12a, facing the LED 14, of the composite lens structure 16 has a circular tip segment 16a, and two tilted elliptical base segments 16b and 16c, respectively. The circular tip segment 16a of the concave composite lens structure 16 is the segment furthest from the light input surface 12a. Although the composite lens features for the preferred embodiment of this invention are disposed in a concave direction on the light input surface, the composite lens may also be in a convex direction on the light input surface.

The length $T_1$ is the distance between the intersections of the extensions of the tangent at the top of the elliptical base segments 16b and 16c, and the tangent of the circular tip segment 16a, where the tangent of the circular tip segment 16a is parallel to the light input surface 12a. The length $T_2$ is the total width of the circular tip segment 16a taken where the circular tip segment 16a intersects the two elliptical base segments 16b and 16c. Note, $T_2$ is parallel to $T_1$. The contact angle $A_1$ is the contact angle of the circular tip segment 16a. Contact angle $A_1$ is preferably greater than 0.1 degrees and less than or equal to 85 degrees. Referring now to FIG. 6b, the gap G is the distance between each adjacent composite lens. Preferably, the gap G is less than or equal to 0.9 times the pitch P. The pitch P of the linear composite lens array 16 is the distance along the light input edge which includes the gap G distance and the total width B of the composite lens. Preferably the pitch P is greater than or equal to 5 micrometers and less than or equal to 1 millimeter (mm). The total height H of the feature is measured from the light input edge to the tangent of the circular tip segment 16a. The total height H of the composite lens is greater than or equal to 3 micrometers and less than or equal to 1 millimeter. The light input surface 12a will have a surface finish of 10 nanometers to 2 micrometers. The surface finish of the concave composite lens structures 16 can be the same or different than the gap G portion between the features.

Advantageously, the shape of an XY section of the circular tip segment 16a satisfies the following expression (1):

$$y_1 = a_1 + \sqrt{(r_1^2 - x^2)} \qquad (1)$$

where the circular tip segment 16a has a first radius $r_1$. The first radius $r_1$ is defined as the quotient of half the distance $T_1$ divided by the tangent of half the contact angle $A_1$. The value $a_1$ is defined as the total height H minus the radius $r_1$ of the circular tip segment 16a. The value x is a value in the direction of the light input surface and is preferably set within the range of $-r_1 \times \sin(A_1) \leq x \leq r_1 \times \sin(A_1)$. The value $y_1$ is a value in the light propagation direction. Referring now to FIG. 6c, the composite lens structure also comprises two tilted elliptical segments, namely a first elliptical base segment 16b and a second elliptical base segment 16c. Each elliptical base segment comprises two contact angles, a top contact angle and a bottom contact angle. The first elliptical base segment 16b has a top contact angle $A_{41}$ and a bottom contact angle $A_{42}$. The second elliptical base segment 16c has a top contact angle $A_{51}$ and a bottom contact angle $A_{52}$. The top contact angle $A_{41}$ is created by a tangent to the first elliptical base segment 16b at the point where the circular tip segment 16a and the first elliptical base segment 16b intersect. The bottom contact angle $A_{42}$ is created by a tangent to the first elliptical base segment 16b at the point where the first elliptical base segment 16b intersects the light input surface 12a. The top contact angle $A_{41}$ of the first elliptical base segment 16b and the top contact angle $A_{51}$ of the second elliptical base segment 16c are equal. The bottom contact angle $A_{42}$ of the first elliptical base segment 16b and the bottom contact angle $A_{52}$ of the second elliptical base segment 16c are equal. The contact angles for each of the two elliptical base segments 16b and 16c are smaller than the contact angle $A_1$ of the circular tip segment 16a.

Advantageously, the shape of an XY section of the elliptical base segments 16b and 16c as shown in FIG. 6c satisfy the following expressions (2 and 3) respectively:

$$y_4 = d_4 - b_4 \times \sqrt{(1 - ((x + c_4)/a_4)^2)} \qquad (2)$$

$$y_5 = d_5 - b_5 \times \sqrt{(1 - ((x - c_5)/a_5)^2)} \qquad (3)$$

Wherein:

$H_3 = H - r_1 \times [1 - \cos(A_1)]$ $B = P - G$ $$a_4 = ab_4 \times \sqrt{\frac{(B - T_2) \times [4H_3 + (\tan(A_{41}) + \tan(A_{42})) \times (B - T_2)]}{(\tan(A_{41}) + \tan(A_{42}))}}$$

$$b_4 = 2 \times ab_4 \times \sqrt{\frac{H_3 \times [H_3 \times (\tan(A_{41}) + \tan(A_{42})) + \tan(A_{41}) \times \tan(A_{42}) \times (B - T_2)]}{(\tan(A_{41}) + \tan(A_{42}))}}$$

where:

$$ab_4 = \frac{(\tan(A_{41}) + \tan(A_{42})) \times (2H_3 + \tan(A_{41}) \times (B - T_2)) \times (2H_3 + \tan(A_{42}) \times (B - T_2))}{4 \times [4H_3 + (\tan(A_{41}) + \tan(A_{42})) \times (B - T_2)] \times [H_3 \times (\tan(A_{41}) + \tan(A_{42})) + \tan(A_{41}) \times \tan(A_{42}) \times (B - T_2)]}$$

$$c_4 = \frac{\tan(A_{41}) \times \lfloor 2H_3 \times B + \tan(A_{42}) \times (B^2 - T_2^2) \rfloor + 2H_3 \times T_2 \times \tan(A_{42})}{4 \times \{\tan(A_{41}) \times [H_3 + \tan(A_{42}) \times (B - T_2)] + H_3 \times \tan(A_{42})\}}$$

$$d_4 = \frac{H_3 \times [2H_3 + \tan(A_{41}) \times (B - T_2)]}{4H_3 + (\tan(A_{41}) + \tan(A_{42})) \times (B - T_2)}$$

Thus, the first elliptical base segment 16b has a top contact angle $A_{41}$ and a bottom contact angle $A_{42}$ and the second elliptical base segment 16c has a top contact angle $A_{51}$ and a bottom contact angle $A_{52}$. Referencing FIGS. 6a and 6c, and equation 2, the height $H_3$ of the first elliptical base segment 16b is equal to the total height H of the composite lens feature 16 minus the radius $r_1$ of the circular tip segment 16a times the quantity 1 minus the cosine of contact angle $A_1$ of the circular tip segment 16a. The total width B of the composite lens feature 16 is equal to the pitch P of the composite lens array minus the gap G distance. Preferably gap G is greater than 0 and less than or equal to 0.9 times the pitch P. The pitch P is preferably greater than or equal to 5 micrometers and less than or equal to 1 millimeter. The height of the second elliptical base segment 16c is equal to the height $H_3$ of the first elliptical base segment 16b.

The parameter $a_4$ is equal to the parameter $ab_4$ times the square root of the quotient of the quantity of the total width B of the composite lens feature 16 minus the total width $T_2$ of the circular tip segment 16a times the quantity 4 times the height $H_3$ of the elliptical base segment 16b plus the tangent of contact angle $A_{41}$ at the top of the first elliptical base segment 16b plus the tangent of contact angle $A_{42}$ at the bottom of the first elliptical base segment 16b the quantity of the total width B of the composite lens feature 16 minus the total width $T_2$ of the circular tip segment 16a divided by the quantity the tangent of contact angle $A_{41}$ at the top of the first elliptical base segment 16b plus the tangent of contact angle $A_{42}$ at the bottom of the first elliptical base segment 16b.

The parameter $b_4$ is equal to 2 times the parameter $ab_4$ times the square root of the quotient of the quantity of the height $H_3$ of the first elliptical base segment 16b times the quantity the height $H_3$ of the first elliptical base segment 16b times the tangent contact angle $A_{41}$ of the top of the first elliptical base segment 16b plus the tangent contact angle $A_{42}$ at the bottom of elliptical base segment 16b plus the tangent contact angle $A_{41}$ times the tangent contact angle $A_{42}$ times the quantity of the total width B of the composite lens feature 16 minus the total width $T_2$ of the circular tip segment 16a divided by the quantity of tangent contact angle $A_{41}$ plus tangent contact angle $A_{42}$.

The parameter $ab_4$ is equal to the quotient of the quantity the tangent of contact angle $A_{41}$ at the top of the first elliptical base segment 16b plus the tangent of contact angle $A_{42}$ at the bottom of the first elliptical base segment 16b times the quantity twice the height $H_3$ of the first elliptical base segment 16b plus the tangent of contact angle $A_{41}$ at the top of the first elliptical base segment 16b times the total width B of the composite lens feature 16 minus the total width $T_2$ of the circular tip segment 16a times the quantity twice the height $H_3$ of the first elliptical base segment 16b plus the tangent of contact angle $A_{42}$ at the bottom of the first elliptical base segment 16b times the total width B of the composite lens feature 16 minus the total width $T_2$ of the circular tip segment 16a divided by four times the following quantities the quantity the height $H_3$ of the first elliptical base segment 16b times 4 plus the tangent of contact angle $A_{41}$ at the top of the first elliptical base segment 16b plus the tangent of contact angle $A_{42}$ at the bottom of the first elliptical base segment 16b times the total width B of the composite lens feature 16 minus the total width $T_2$ of the circular tip segment 16a, plus the quantity the height $H_3$ of the first elliptical base segment 16b times the quantity the tangent of contact angle $A_{41}$ at the top of the first elliptical base segment 16b plus the tangent of contact angle $A_{42}$ at the bottom of the first elliptical base segment 16b plus the tangent of contact angle $A_{41}$ at the top of the first elliptical base segment 16b times the tangent of contact angle $A_{42}$ at the bottom of the first elliptical base segment 16b times the quantity times the total width B of the composite lens feature 16 minus the total width $T_2$ of the circular tip segment 16a.

The parameter $c_4$ is equal to the quotient of the quantity the tangent contact angle $A_{41}$ at the top of the first elliptical base segment 16b times the quantity twice the height $H_3$ of the first elliptical base segment 16b times the total width B of the composite lens feature 16 plus the tangent contact angle $A_{42}$ times the quantity the total width B of the composite lens feature 16 squared minus the total width $T_2$ of the circular tip segment 16a squared, that quantity plus twice the height $H_3$ of the first elliptical base segment 16b times the total width $T_2$ of the circular tip segment 16a times the tangent of contact angle $A_{42}$ at the bottom of the first elliptical base segment 16b divided by the tangent contact angle $A_{41}$ at the top of the first elliptical base segment 16b times the quantity the height $H_3$ of the first elliptical base segment 16b plus the tangent of contact angle $A_{42}$ at the bottom of the first elliptical base segment 16b times the quantity of the total width B of the composite lens feature 16 minus the total width $T_2$ of the circular tip segment 16a plus quantity the height $H_3$ of the first elliptical base segment 16b times the tangent of contact angle $A_{42}$ at the bottom of the first elliptical base segment 16b the quantities of the divisor times 4.

The parameter $d_4$ is equal to the quotient of the quantity twice the height $H_3$ of the first elliptical base segment 16b plus the tangent contact angle $A_{41}$ at the top of the first elliptical base segment 16b times the quantity the total width B of the composite lens feature 16 minus the total width $T_2$ of the circular tip segment 16a, the previous quantities times the height $H_3$ of the first elliptical base segment 16b divided by the height $H_3$ of the first elliptical base segment 16b times 4 plus the quantity plus the tangent of contact angle $A_{41}$ at the top of the first elliptical base segment 16b plus the tangent of contact angle $A_{42}$ at the bottom of the first elliptical base segment 16b times the quantity the total width B of the composite lens feature 16 squared minus the total width $T_2$ of the circular tip segment 16a.

The coordinate x is a value in the direction of the input edge or more specifically in the direction of the total width of the composite lens feature 16 and is preferably set within the range of $-B/2 \leq x \leq -T_2/2$ for the first elliptical base segment 16b. The coordinate $y_4$ is a value in the light propagation direction.

Referencing FIGS. 6a and 6c, and equation 3, the height $H_3$ of the second elliptical base segment 16c is equal the height of the first elliptical base segment 16b. The total width B of the composite lens feature 16 is equal to the pitch P of the composite lens array minus the gap G distance. Preferably gap G is greater than 0 and less than or equal to 0.9 times the pitch P.

$$a_5 = ab_5 \times \sqrt{\frac{(B-T_2) \times [4H_3 + (\tan(A_{51}) + \tan(A_{52})) \times (B-T_2)]}{(\tan(A_{51}) + \tan(A_{52}))}}$$

$$b_5 = 2 \times ab_5 \times$$

$$\sqrt{\frac{H_3 \times [H_3 \times (\tan(A_{51}) + \tan(A_{52})) + \tan(A_{51}) \times \tan(A_{52}) \times (B-T_2)]}{(\tan(A_{51}) + \tan(A_{52}))}}$$

where:

$$ab_5 = \frac{(\tan(A_{51}) + \tan(A_{52})) \times (2H_3 + \tan(A_{51}) \times (B-T_2)) \times (2H_3 + \tan(A_{52}) \times (B-T_2))}{4 \times [4H_3 + (\tan(A_{51}) + \tan(A_{52})) \times (B-T_2)] \times [H_3 \times (\tan(A_{51}) + \tan(A_{52})) + \tan(A_{51}) \times \tan(A_{52}) \times (B-T_2)]}$$

$$c_5 = \frac{\tan(A_{51}) \times [2H_3 \times B + \tan(A_{52}) \times (B^2 - T_2^2)] + H_3 \times T_2 \times \tan(A_{52})}{4 \times \{\tan(A_{51}) \times [H_3 + \tan(A_{52}) \times (B-T_2)] + H_3 \times \tan(A_{52})\}}$$

$$d_5 = \frac{H_3 \times [2H_3 + \tan(A_{51}) \times (B-T_2)]}{4H_3 + (\tan(A_{51}) + \tan(A_{52})) \times (B-T_2)}$$

The parameter $a_5$ is equal to the parameter $ab_5$ times the square root of the quotient of the quantity of the total width B of the composite lens feature 16 minus the total width $T_2$ of the circular tip segment 16a times the quantity 4 times the height $H_3$ of the second elliptical base segment 16c plus the tangent of contact angle $A_{51}$ at the top of the second elliptical base segment 16c plus the tangent of contact angle $A_{52}$ at the bottom of the second elliptical base segment 16c the quantity of the total width B of the composite lens feature 16 minus the total width $T_2$ of the circular tip segment 16a divided by the quantity the tangent of contact angle $A_{51}$ at the top of the second elliptical base segment 16c plus the tangent of contact angle $A_{52}$ at the bottom of the second elliptical base segment 16c.

The parameter $b_5$ is equal to 2 times the parameter $ab_5$ times the square root of the quotient of the quantity of the height $H_3$ of the second elliptical base segment 16c times the quantity the height $H_3$ of the second elliptical base segment 16c times the tangent contact angle $A_{51}$ of the top of the second elliptical base segment 16c plus the tangent contact angle $A_{52}$ at the bottom of elliptical base segment 16c plus the tangent contact angle $A_{51}$ times the tangent contact angle $A_{52}$ times the quantity of the total width B of the composite lens feature 16 minus the total width $T_2$ of the circular tip segment 16a divided by the quantity of tangent contact angle $A_{51}$ plus tangent contact angle $A_{52}$.

The parameter $ab_5$ is equal to the quotient of the quantity the tangent of contact angle $A_{51}$ at the top of the second elliptical base segment 16c plus the tangent of contact angle $A_{52}$ at the bottom of the second elliptical base segment 16c times the quantity twice the height $H_3$ of the second elliptical base segment 16c plus the tangent of contact angle $A_{51}$ at the top of the second elliptical base segment 16c times the total width B of the composite lens feature 16 minus the total width $T_2$ of the circular tip segment 16a times the quantity twice the height $H_3$ of the second elliptical base segment 16c plus the tangent of contact angle $A_{52}$ at the bottom of the second elliptical base segment 16c times the total width B of the composite lens feature 16 minus the total width $T_2$ of the circular tip segment 16a divided by four times the following quantities the quantity the height $H_3$ of the second elliptical base segment 16c times 4 plus the tangent of contact angle $A_{51}$ at the top of the second elliptical base segment 16c plus the tangent of contact angle $A_{52}$ at the bottom of the second elliptical base segment 16c times the total width B of the composite lens feature 16 minus the total width $T_2$ of the circular tip segment 16a, plus the quantity the height $H_3$ of the second elliptical base segment 16c times the quantity the tangent of contact angle $A_{51}$ at the top of the second elliptical base segment 16c plus the tangent of contact angle $A_{52}$ at the bottom of the second elliptical base segment 16c plus the tangent of contact angle $A_{51}$ at the top of the second elliptical base segment 16c times the tangent of contact angle $A_{52}$ at the bottom of the second elliptical base segment 16c times the quantity times the total width B of the composite lens feature 16 minus the total width $T_2$ of the circular tip segment 16a.

The parameter $c_5$ is equal to the quotient of the quantity tangent contact angle $A_{51}$ at the top of the second elliptical base segment 16c times the quantity twice the height $H_3$ of the second elliptical base segment 16c times the total width B of the composite lens feature 16 plus the tangent contact angle $A_{52}$ times the quantity the total width B of the composite lens feature 16 squared minus the total width $T_2$ of the circular tip segment 16a squared, that quantity plus twice the height $H_3$ of the second elliptical base segment 16c times the total width $T_2$ of the circular tip segment 16a times the tangent of contact angle $A_{52}$ at the bottom of the second elliptical base segment 16c divided by the tangent contact angle $A_{51}$ at the top of the second elliptical base segment 16c times the quantity the height $H_3$ of the second elliptical base segment 16c plus the tangent of contact angle $A_{52}$ at the bottom of the second elliptical base segment 16c times the quantity of the total width B of the composite lens feature 16 minus the total width $T_2$ of the circular tip segment 16a plus quantity the height $H_3$ of the second elliptical base segment 16c times the tangent of contact angle $A_{52}$ at the bottom of the second elliptical base segment 16c the quantities of the divisor times 4.

The parameter $d_5$ is equal to the quotient of the quantity twice the height $H_3$ of the second elliptical base segment 16c plus the of tangent contact angle $A_{51}$ at the top of the second elliptical base segment 16c times the quantity the total width B of the composite lens feature 16 minus the total width $T_2$ of the circular tip segment 16a, the previous quantities times the height $H_3$ of the second elliptical base segment 16c divided by the height $H_3$ of the second elliptical base segment 16c times 4 plus the quantity plus the tangent of contact angle $A_{51}$ at the top of the second elliptical base segment 16c plus the tangent of contact angle $A_{52}$ at the bottom of the second elliptical base segment 16c times the quantity the total width B of the composite lens feature 16 squared minus the total width $T_2$ of the circular tip segment 16a.

The coordinate x is a value in the direction of the input edge or more specifically in the direction of the total width of the composite lens feature 16 and is preferably set within the range of $T_2/2 \leq x \leq B/2$ for the second elliptical base segment 16c. The coordinate $y_5$ is a value in the light propagation direction.

The contact angles for the composite lens feature can be described where $A_{41}=A_{51}$, $A_{42}=A_{52}$ and $A_1 \geq A_{42}$, $A_{41}$. Preferably, $A_1 \geq A_{42}$, $A_{41} \leq 85$ degrees.

Figure 7A:
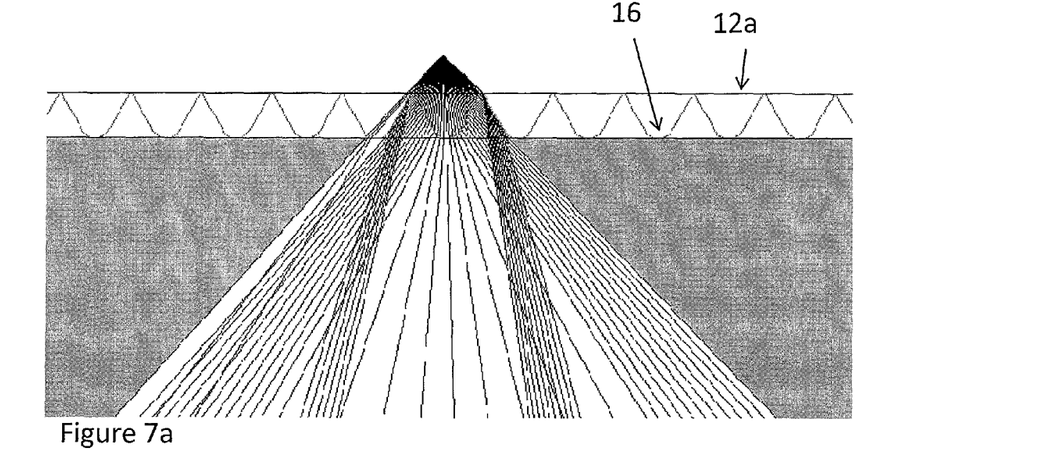
FIGS. 7a and 7b show schematic diagrams illustrating the light diffusing capability of the composite lens feature with a gap between each adjacent feature.
Figure 7B:
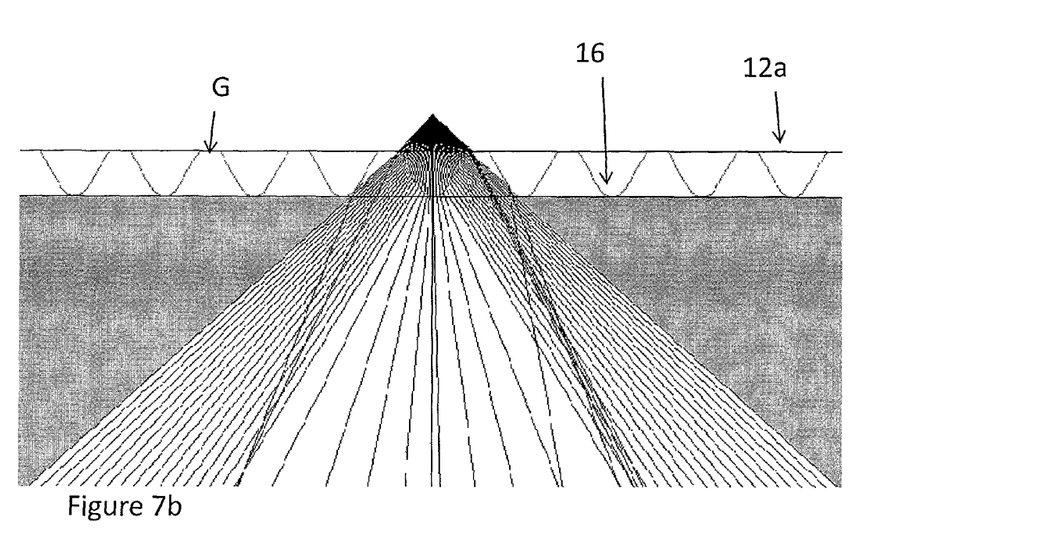

FIG. 7a is a ray tracing for an array of a single composite lens feature 16 of this invention illustrating what happens to the light rays when the individual composite lens features are disposed on the light input surface 12a in a contiguous manner such that there is no gap G between adjacent composite lenses. FIG. 7b is a similar ray tracing, but where the individual composite lens feature is separated by a gap G between adjacent features. The gap G is preferably less than or equal to 0.9P where P (as shown in FIG. 6b) is the pitch of the composite lens feature on the input surface 12a. In FIG. 7a, where the composite lens features are adjacent each other along the input surface, some of the light rays will experience a secondary light collimation as they are refracted when they reach the side of the adjacent feature. This secondary light collimation detracts from the diffusion capability of the composite lens feature 16. In FIG. 7b, the composite lens features are separated by a gap G. The gap allows the light ray to continue in a diffuse manner and thus widens the angle at which the light propagates in the light guide film. There is minimal secondary light collimation when the gap between features is incorporated into the composite lens feature design. In this way, the wider angle of light helps to mitigate the hot spots along the input surface of the light guide film.

Figure 8:
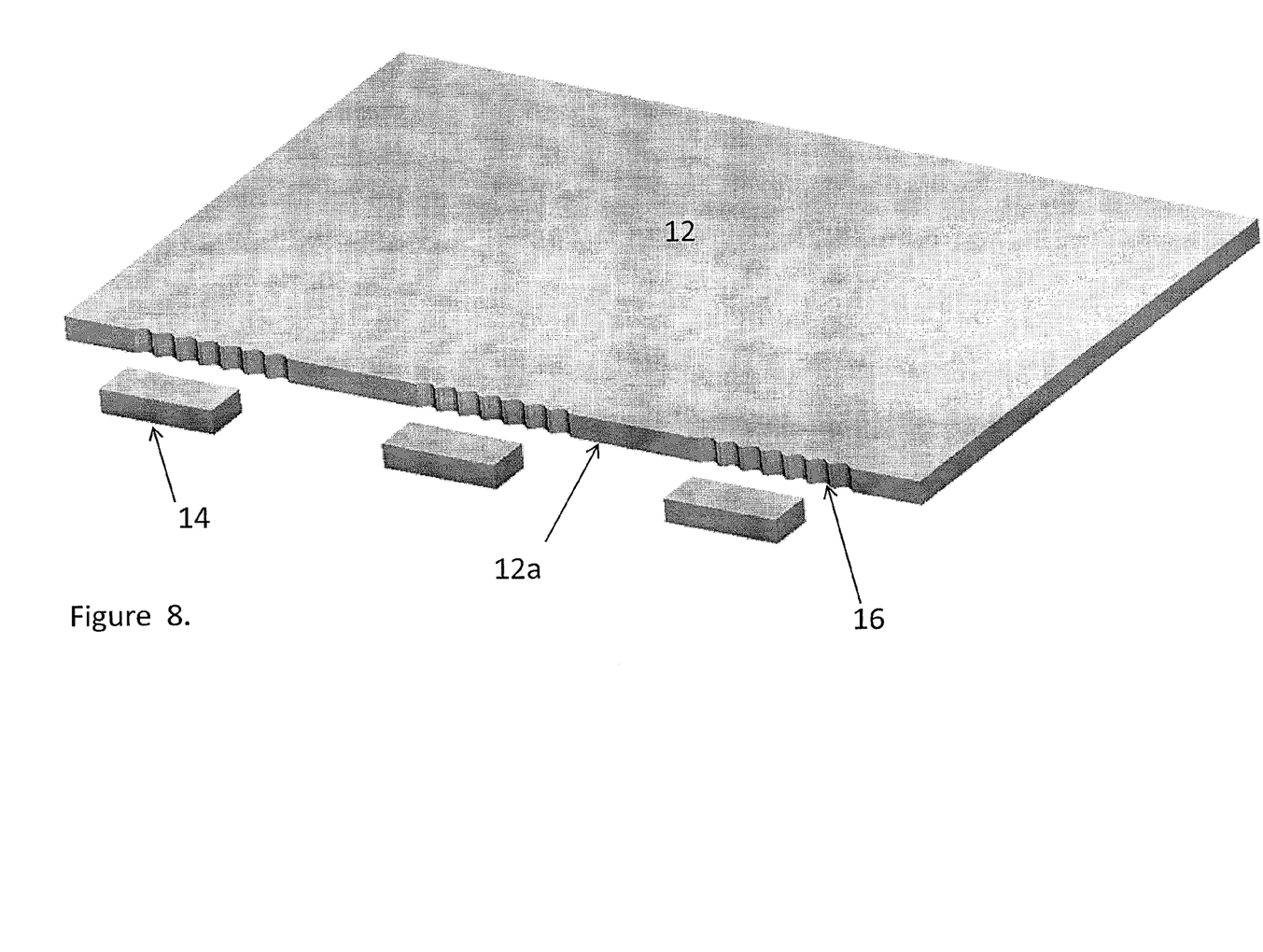
FIG. 8 shows another embodiment of this invention.

Referring now to FIG. 8, the light guide film 12 in FIG. 8 shows the composite lens features 16 not disposed along the entire input surface 12a. Instead, the composite lens features 16 are disposed along the light input surface 12a in the region where the LED 14 light is incident. The luminance uniformity of the system is minimally affected as the unpatterned region on the light input surface has minimal light rays in this region.

EXAMPLES

Figure 9A:
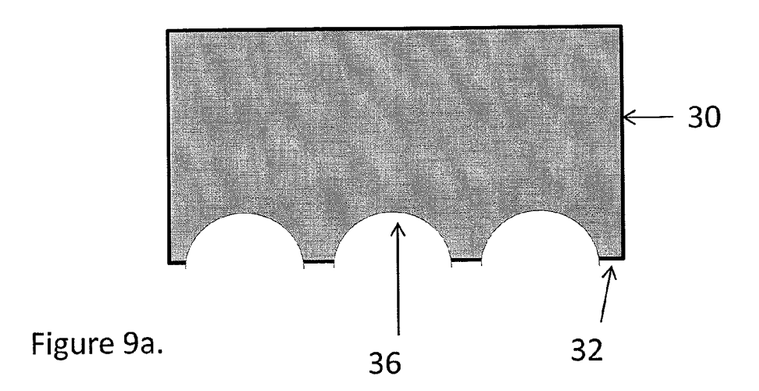
FIGS. 9a and 9b show the luminance intensity at various distances from the light input surface for a circular or arc shaped input feature.
Figure 9B:
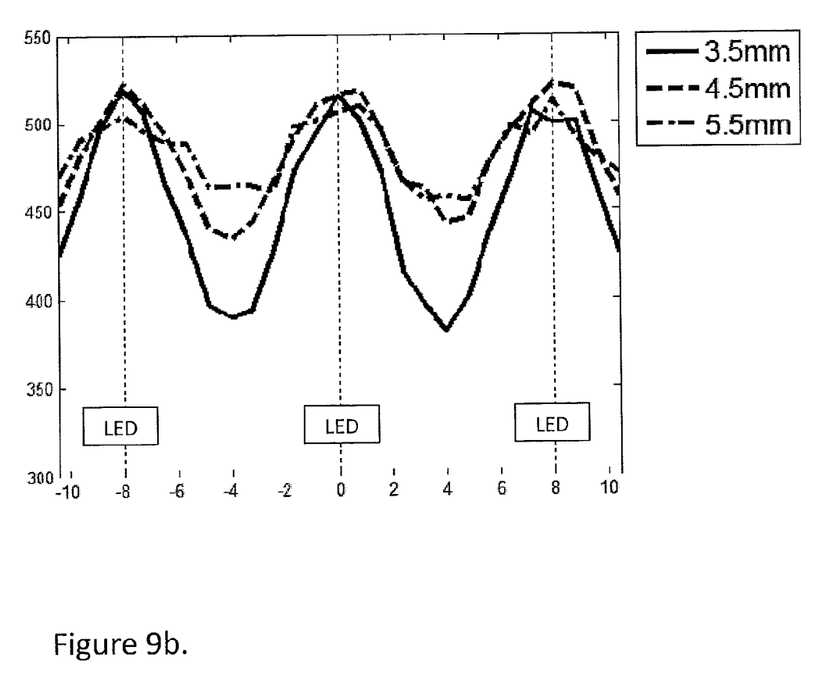

FIG. 9a shows a portion of the light input surface 32 of a light guide film 30 with an arc- or circular-type structure 36. The graph in FIG. 9b illustrates the light intensity for the light guide film 30 at distances 3.5 mm, 4.5 mm and 5.5 mm from the light input surface 32. FIG. 9b shows that the localized light intensity decreases as the distance increases from the light input surface, but there are still some hot spots evident at 5.5 mm The arc- or circular-type structure solution provides some improvement for hot spots but is more effective at collimating light in line with the LED than widening the incidence angle. This is evident in the graph in FIG. 9b. In FIG. 9b, the LEDs are located at each of the vertical dotted lines and the light distribution is still not leveled out at 5.5 mm into the light guide film. It is apparent from the graph in FIG. 9b that the arc- or circular-type solution has insufficient diffusion capability.

Figure 10A:
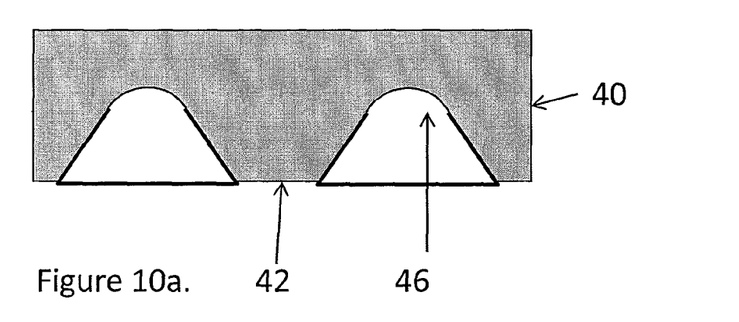
FIGS. 10a and 10b show the luminance intensity at various distances from the light input surface for a trapezoidal feature or feature with slanted sides.
Figure 10B:
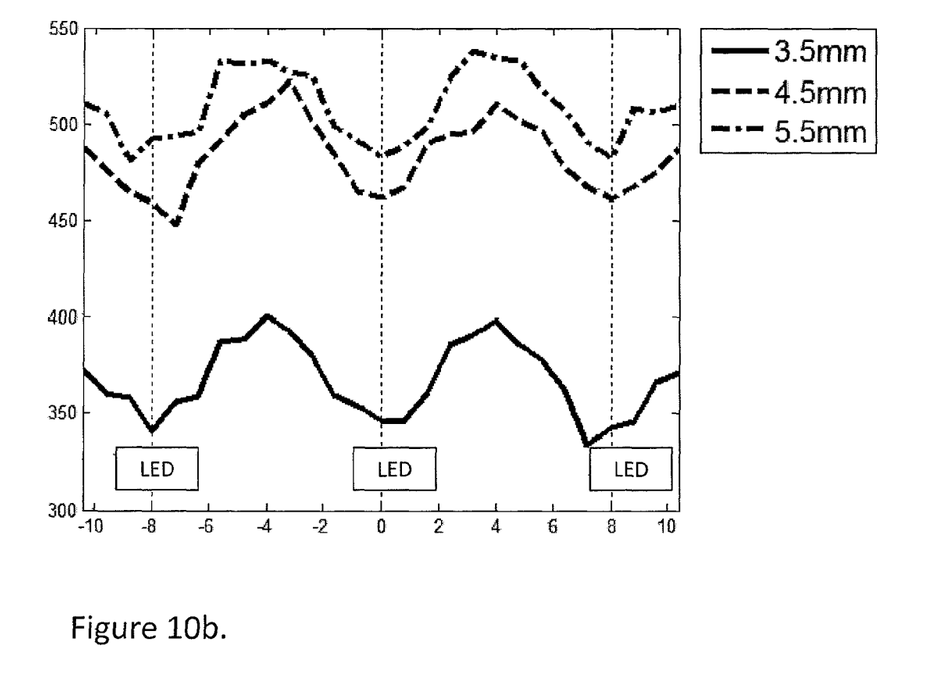

FIG. 10a shows a portion of the light input surface 42 of a light guide film 40 with a composite lens structure that has flat slanted sides 46. This result would also be applicable to a trapezoidal shaped light input structure. The graph in FIG. 10b illustrates the light intensity for the light guide film 40 at distances 3.5 mm, 4.5 mm and 5.5 mm from the light input surface 42. FIG. 10b shows that the localized light intensity actually inverts in the area immediately in front of the LEDs, resulting in a dark spot immediately in front of the LEDs. This overall loss of light intensity immediately in front of the LED is due to the fact that the straight slanted walls diffuse the light more readily through the sides than through the tip. It is also noted that the shape of the light intensity profile across the light guide film does not change significantly as the distance increases from the input surface 42.

Figure 11A:
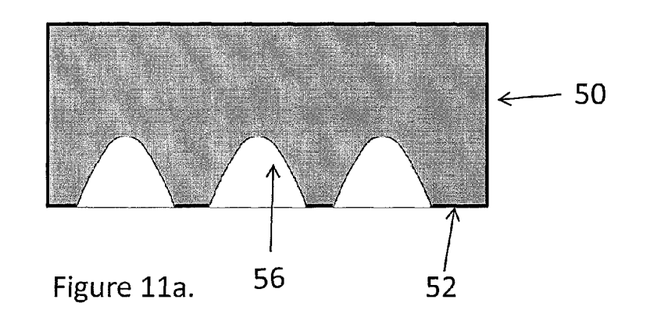
FIGS. 11a and 11b show the luminance intensity at various distances from the light input surface according to an embodiment of the invention.
Figure 11B:
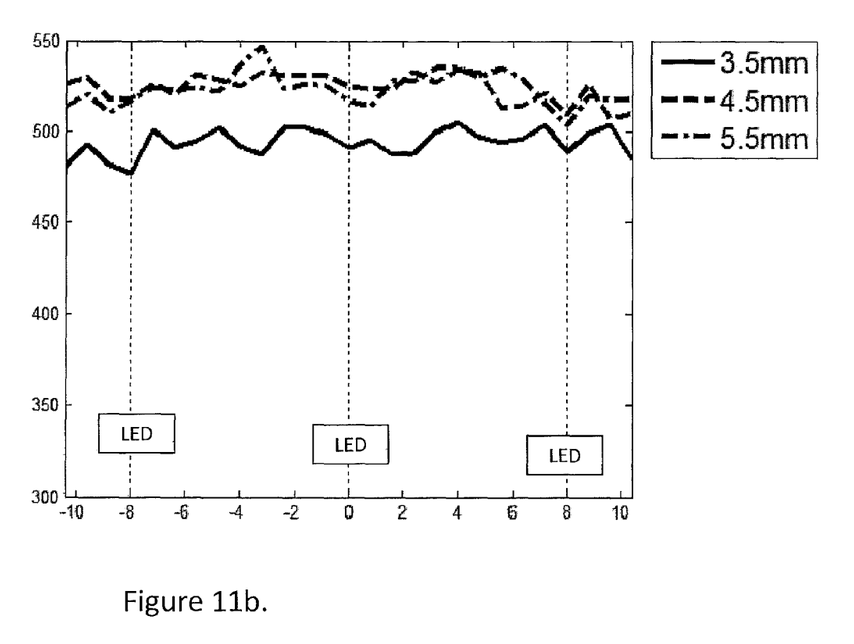

FIG. 11a shows a portion of the light input surface 52 of a light guide film 50 with the composite lens feature 56 of this invention. The composite lens feature utilizes a circular tip segment and two tilted elliptical base segments. The top and bottom contact angles for each of the two tilted elliptical base segments are equal. The top and bottom contact angles for each of the two tilted elliptical base segments are less than the contact angle of the circular tip segment. The circular tip segment uniformly distributes the light in the area immediately in front of the LED. The two tilted elliptical base segments uniformly distribute the light between the LEDs. The smooth curvatures of the circular tip segment and the two tilted elliptical base segments maximize the uniformity of the light spatial distribution so the output light is uniform. The graph in FIG. 11b illustrates that the composite lens 56 of the present invention generates uniform light output across the light guide film at distances of 3.5 mm, 4.5 mm and 5.5 mm from the input surface 52.

Hence, an improved light guide film is provided with symmetric light redirecting features to improve light output uniformity without sacrificing light input efficiency. Namely, the improved light guide film 12 having composite lens structure 16 provides enhanced light diffusion in the plane parallel to the light extraction plane and light reflection plane (top and bottom surfaces), allowing greater light redistribution between discrete light sources (light traveling outside the critical angle of planar un-serrated input edge), so that the light output uniformity is improved. Moreover, the light distribution in the plane perpendicular to the light extraction plane and light reflection plane (top and bottom surfaces) is minimized, so that the condition of the total internal reflection is minimized for the inputted traveling light.

The invention claimed is:

1. A planar light guide film for a backlight unit having at least one point light source, the light guide film comprising: a light input surface for receiving light from the point light source; a light redirecting surface for redirecting light received from the light input surface; a light output surface for outputting at least the light redirected from the light redirecting surface; wherein the light input surface further comprises a composite lens structure having a circular tip segment with a first contact angle, and a first and second elliptical base segments with a second contact angle, the second contact angle being less than the first contact angle and the second contact angle being equal to each other; and wherein the circular tip segment satisfies the following equation:

$$y_1 = a_1 + \sqrt{(r_1^2 - x^2)}$$

and the elliptical base segments satisfies the following equations:

$$y_4 = d_4 + b_4 \times \sqrt{(1 - ((x+c_4)/a_4)^2)}$$

$$y_5 = d_5 + b_5 \times \sqrt{(1 - ((x-c_5)/a_5)^2)}.$$

2. The planar light guide film of claim 1 wherein the composite lens structure has a pitch P greater than or equal to 5 micrometers and less than or equal to 1 millimeter.

3. The planar light guide film of claim 2 wherein the composite lens structure has a gap G less than or equal to 0.9 times the pitch P.

4. The planar light guide film of claim 1 wherein the composite lens structure has a total height H greater than 3 micrometers and less than or equal to 1 millimeter.

5. The planar light guide film of claim 1 wherein the circular tip segment of the composite lens structure has a contact angle $A_1$ greater than 0.1 degrees and less than or equal to 85 degrees.

6. The planar light guide film of claim 5 wherein the composite lens structure further comprises contact angles $A_{41}$, $A_{51}$, $A_{42}$, and $A_{52}$ wherein $A_{41} = A_{51}$, $A_{42} = A_{52}$ and $A_1 \geq A_{42}$, $A_{41}$.

7. A planar light guide film for a backlight unit having at least one point light source, the light guide film comprising: a light input surface for receiving light from the point light source; a light redirecting surface for redirecting light received from the light input surface; a light output surface for outputting at least the light redirected from the light redirecting surface; wherein the light input surface further comprises a composite lens structure having gaps there between, the lens structure having a circular tip segment with a first contact angle, and a first and second elliptical base segments with a second contact angle, the second contact angle being less than the first contact angle and the second contact angle being equal to each other; and wherein the circular tip segment satisfies the following equation:

$$y_1 = a_1 + \sqrt{(r_1^2 - x^2)}$$

and the elliptical base segments satisfies the following equations:

$$y_4 = d_4 + b_4 \times \sqrt{(1 - ((x+c_4)/a_4)^2)}$$

$$y_5 = d_5 + b_5 \times \sqrt{(1 - ((x-c_5)/a_5)^2)}.$$

8. The planar light guide film of claim 7 wherein the circular tip segment of the composite lens structure has a contact angle $A_1$ greater than 0.1 degrees and less than or equal to 85 degrees.

9. The planar light guide film of claim 8 wherein the composite lens structure further comprises contact angles $A_{41}$, $A_{51}$, $A_{42}$, and $A_{52}$ wherein $A_{41} = A_{51}$, $A_{42} = A_{52}$ and $A_1 \geq A_{42}$, $A_{41}$.

10. A planar light guide film for a backlight unit having at least one point light source, the light guide film comprising: a light input surface for receiving light from the point light source; a light redirecting surface for redirecting light received from the light input surface; a light output surface for outputting at least the light redirected from the light redirecting surface; wherein the light input surface further comprises a serrated lens structure that is provided only where the point light source is incident on the light input surface, the lens structure having a circular tip segment with a first contact angle, and a first and second elliptical base segments with a second contact angle, the second contact angle being less than the first contact angle and the second contact angle being equal to each other; and wherein the circular tip segment satisfies the following equation:

$$y_1 = a_1 + \sqrt{(r_1^2 - x^2)}$$

and the elliptical base segments satisfies the following equations:

$$y_4 = d_4 + b_4 \times \sqrt{(1 - ((x+c_4)/a_4)^2)}$$

$$y_5 = d_5 + b_5 \times \sqrt{(1 - ((x-c_5)/a_5)^2)}.$$

* * * * *